(12) United States Patent
Jo (10) Patent No.: US 12,271,988 B2
(45) Date of Patent: Apr. 8, 2025

(54) METHOD AND APPARATUS FOR CONVERTING 3D MANUALS INTO 2D INTERACTIVE VIDEOS FOR CLOUD SERVICE

(71) Applicant: INHA University Research and Business Foundation, Incheon (KR)

(72) Inventor: Geun Sik Jo, Incheon (KR)

(73) Assignee: INHA UNIVERSITY RESEARCH AND BUSINESS FOUNDATION, Incheon (KR)

(*) Notice: Subject to any disclaimer, the term of this patent is extended or adjusted under 35 U.S.C. 154(b) by 365 days.

(21) Appl. No.: 17/747,487

(22) Filed: May 18, 2022

(65) Prior Publication Data

US 2023/0245370 A1 Aug. 3, 2023

(30) Foreign Application Priority Data

Feb. 3, 2022 (KR) .................... 10-2022-0026672

(51) Int. Cl.
| | |
|---|---|
| *G06T 13/80* | (2011.01) |
| *G06T 11/60* | (2006.01) |
| *G06V 10/74* | (2022.01) |
| *G06V 10/82* | (2022.01) |
| *G06V 20/40* | (2022.01) |
| *G06V 20/62* | (2022.01) |
| *G11B 27/031* | (2006.01) |

(52) U.S. Cl.
CPC .............. *G06T 13/80* (2013.01); *G06T 11/60* (2013.01); *G06V 10/74* (2022.01); *G06V 10/82* (2022.01);
(Continued)

(58) Field of Classification Search
CPC ....... G06T 13/80; G06T 11/60; G06T 13/205; G06T 19/00; G06T 2219/004;
(Continued)

(56) References Cited

U.S. PATENT DOCUMENTS

| 9,318,108 B2* | 4/2016 | Gruber .................... G10L 21/06 |
|---|---|---|
| 10,049,668 B2* | 8/2018 | Huang ................... G10L 15/285 |

(Continued)

FOREIGN PATENT DOCUMENTS

KR 101072347 B1 11/2010

*Primary Examiner* — Negussie Worku
(74) *Attorney, Agent, or Firm* — Madeline F. Schiesser (57) ABSTRACT

Disclosed are a method and apparatus for converting 3D manuals into 2D interactive videos for a cloud service. The method for converting 3D manuals into 2D interactive videos for a cloud service, proposed in the present disclosure, includes the steps of performing labeling for annotations in a 3D manual for a cloud service and machine learning for recognizing the annotations; automatically recognizing the annotations, fine-adjusting automatically unrecognized annotations, and generating a file for converting the 3D manual into a 2D interactive video; linking the 3D manual to a corresponding 2D manual using the file; extracting and handling artificial intelligence knowledge based on work instructions in the 2D manual; and performing neural network tasks and linguistic inferences for processing voice requests, and informing the user about the handling and completion of a requested task by sending visual and audio feedback, in order to execute commands based on the artificial intelligence knowledge, the digital twin, and the annotations in the 3D manual.

6 Claims, 12 Drawing Sheets

(52) U.S. Cl.
CPC .............. *G06V 20/40* (2022.01); *G06V 20/63* (2022.01); *G11B 27/031* (2013.01)

(58) Field of Classification Search
CPC .................. G06T 19/003; G06T 19/20; G06T 2207/20084; G06V 10/74; G06V 10/82; G06V 20/40; G06V 20/63; G06V 30/19; G06V 30/422; G11B 27/031; H04N 21/440218; H04N 21/44016; G10L 15/16
USPC ......................................................... 382/154
See application file for complete search history.

(56) References Cited

U.S. PATENT DOCUMENTS

| | | | |
|---|---|---|---|
| 11,153,277 B2 * | 10/2021 | Park ...................... H04L 63/308 |
| 11,204,966 B2 * | 12/2021 | Corvus .................. G06N 5/022 |
| 11,240,567 B2 * | 2/2022 | Todorovic ........ H04N 21/43622 |
| 11,270,060 B2 * | 3/2022 | Nelson .................... G06N 20/00 |
| 11,741,703 B2 * | 8/2023 | Fathi ..................... G06V 20/176 |
| | | | 382/154 |
| 2012/0016678 A1 * | 1/2012 | Gruber ..................... G06F 40/40 |
| | | | 704/E21.001 |
| 2013/0044192 A1 * | 2/2013 | Mukherjee ........... H04N 13/139 |
| | | | 348/51 |
| 2017/0162203 A1 * | 6/2017 | Huang .................. G10L 15/197 |
| 2019/0057722 A1 * | 2/2019 | Key ................... H04N 21/25866 |
| 2020/0082168 A1 * | 3/2020 | Fathi ........................ G06T 7/521 |
| 2020/0094992 A1 * | 3/2020 | Hoover .................... G06V 20/20 |
| 2020/0104028 A1 * | 4/2020 | Vats ..................... G06F 3/04845 |
| 2020/0184726 A1 * | 6/2020 | Jo ....................... G02B 27/0172 |
| 2020/0250237 A1 * | 8/2020 | Corvus ................ G06V 30/274 |
| 2020/0293608 A1 * | 9/2020 | Nelson .................. G06F 40/169 |
| 2020/0413152 A1 * | 12/2020 | Todorovic ........ H04N 21/41265 |
| 2021/0358490 A1 * | 11/2021 | Vaidya .................... G10L 15/22 |
| 2022/0006781 A1 * | 1/2022 | Park ....................... G06N 20/00 |

* cited by examiner

```
{
  "header": {
    "version": 2,
    "id": "FuelHeaterRemoval",
    "owner": "hoya",
    "title": "FuelHeaterRemoval",
    "tags": ""
  },
  "metadataobject": [
    {
      "id": "",
      "name": "[3] drain plug",          ← 1010
      "img": "",
      "content": "[3] drain plug.html",
      "timerange": [
        34.09158524676954,
        35.12466358757808               ← 1020
      ],
      "bbox": [                          ← 1030
        [
          34.09158524676954,
          0.6701442509481353,
          0.3225995142456405
        ],
        [
          0.7912401413590094,
          0.3596162570157915
        ],
        [
          35.12466358757808,
        ]
      ]
    },
    {
      "id": "",
      "name": "[3] drain plug",          ← 1010
      "img": "",
      "content": "[3] drain plug.html",
      "timeRange": [
        37.19082026920316,
        38.22389861001144
      ],
      "bbox": [
        [
          37.19082026920316,
          0.6706921961536146,
          0.3264960134845 8906
        ],
        [
          0.7912401413590094,
          0.3596162570157915
        ],
        [
          38.22389861001144,
          0.6706921961536146,
          0.3264960134845 8906
        ],
        [
          0.7912401413590094,
          0.3596162570157915
        ]
      ]
    },
    {
      "id": "1457_1",
      "name": "[4] o-ring",
      "img": "",
      "content": "[4] o-ring.html",
      "timerange": [
        48.55468201812 2634,
        49.58776035893376
      ],
      "bbox": [
        [
          48.55468201812 2634,
          0.6263089345 09779,
          0.233954156555 17048
        ],
        [
          0.72932233313 3916,
          0.26707440009 03729
        ],
        [
          49.58776035893376,
          0.6263089345 09779,
          0.233954156555 17048
        ],
        [
          0.72932233313 3916,
          0.26707440009 03729
        ]
      ]
    }
```

```
                                0.6701442509481353,
                                0.3225995142456240 5
                              ],[
                                0.7928839739755325,
                                0.3586421322060503
                              ]
                            ]
                          },
                          {
                            "id":
                            "name": "[3] drain plug", ~1010
                            "img":
                            "content": "[3] drain plug.html"
                            "timeRange": [
                              35.12466358757808,
                              36.15774192838 92
                            ],
                            "bbox": [
                              [
                                35.12466358757808
```

```
                              ]
                            ]
                          },
                          {
                            "id":
                            "name": "[4] o-ring", ~1010
                            "img":
                            "content": "[4] o-ring.html",
                            "timeRange": [
                              43.38929031406703,
                              44.42236865487815 6
                            ],
                            "bbox": [
                              [
                                43.38929031406703,
                                0.6285004153316968,
                                0.2339541565591704 8
                              ],[
                                0.7276784975234777,
                                0.2699967745195966 4
                              ]
                            ],[
                              44.42236865487815 6
```

```
                              ]
                            ]
                          },
                          {
                            "id":
                            "name": "[4] o-ring", ~1010
                            "img":
                            "content": "[4] o-ring.html",
                            "timeRange": [
                              50.62083869974487,
                              51.65391704055599 6
                            ],
                            "bbox": [
                              [
                                50.62083869974487,
                                0.6285004153316968,
                                0.2329800317494292
                              ],[
                                0.7287743879344365,
                                0.2690226497098554
                              ]
                            ],[
                              51.65391704055599 6
```

METHOD AND APPARATUS FOR CONVERTING 3D MANUALS INTO 2D INTERACTIVE VIDEOS FOR CLOUD SERVICE

CROSS-REFERENCES TO RELATED APPLICATION

This application is based on and claims priority under 35 U.S.C. 119 to Korean Patent Application No. 10-2022-0026672, filed on 2 Mar. 2022 in the Korean intellectual property office, the disclosures of which are herein incorporated by reference in its entirety.

TECHNICAL FIELD

The present disclosure relates to a method and apparatus for converting 3D manuals into 2D interactive videos for a cloud service.

BACKGROUND OF THE INVENTION

For complicated technical manuals such as on aircraft, a highly qualified expert may create annotations by means of a video annotation tool dedicated for a video to be annotated. In other cases, even a non-expert may create simplified annotations simply by placing text on the screen. In these cases, the created annotations are mostly static annotations that are displayed in a fixed position. Further, these annotations are provided to a viewer, unilaterally or in the form of static text or image without being moved. In some cases, the annotations may interact with the user, but only at a level that provides a link to another video or web site.

For example, Korean Registered Patent No. 10-1072347 issued on 5 Oct. 2011 discloses a technology that creates situation information on a given scene by using text information.

As described above, even if the user is unilaterally provided with a written text or image annotation for a video in a unilateral manner, they are not able to interact with the video and get information from the annotation or add information to it.

Although the user may have the need for acquisition of various information and interaction through annotations, these simplified annotations are merely shown unilaterally and statically, or interactions are provided simply in the form of a link. Thus, the user often has to do some extra work off the screen in order to acquire various information and perform an additional task.

For example, when the user performs work as instructed in a complicated technical manual such as on aircraft, they usually refer to instructions for assembly and disassembly and to paper-based 2D engineering drawings for comparison with real-world three-dimensional mechanical parts. Since they are paper-based 2D manuals, it may be hard to match the part numbers with the parts of the real-world physical machine, and it takes some time to understand how they match, which is time-consuming and less efficient and therefore often cause errors.

Prior Art Document

Korean Registered Patent Publication No. 10-1072347 (issued on 5 Oct. 2011)

SUMMARY

A technical aspect of the present disclosure is to provide a method and apparatus for converting 3D manuals into 2D interactive videos for a cloud service. More specifically, the present disclosure provides a method and apparatus for creating a three-dimensional digital twin of a real machine through XR (eXtended Reality) technology, for a complicated 3D manual such as on aircraft, and for additionally providing instructions, animations, and 2D engineering drawings on the screen which are required for assembly and disassembly.

In one aspect, a method for converting 3D manuals into 2D interactive videos for a cloud service, proposed in the present disclosure, includes the steps of performing labeling for annotations in a 3D manual for a cloud service and machine learning for recognizing the annotations; automatically recognizing the annotations, fine-adjusting automatically unrecognized annotations, and generating a file for converting the 3D manual into a 2D interactive video; linking the 3D manual to a corresponding 2D manual using the file; extracting and handling artificial intelligence knowledge based on work instructions in the 2D manual; and performing neural network tasks and linguistic inferences for processing voice requests, and informing the user about the handling and completion of a requested task by sending visual and audio feedback, in order to execute commands based on the artificial intelligence knowledge, the digital twin, and the annotations in the 3D manual.

In the step of performing labeling for annotations in a 3D manual for a cloud service and machine learning for recognizing the annotations by means of a learning part, the positions of annotation objects in the 3D manual are represented in a coordinate system, and labeling for annotations in the 3D manual is performed so as to automatically recognize the positions of the annotations, and, after the labeling, machine learning is performed to automatically recognize annotations on objects in the video through an object detection model.

In the step of automatically recognizing the annotations, fine-adjusting automatically unrecognized annotations by means of a video editor, and generating a file for converting the 3D manual into a 2D interactive video, the automatically unrecognized annotations are adjusted by adjusting the positions and shapes of the annotations and then adjusting the durations of the annotations by means of the video editor, and the automatically recognized annotations represent a list of taks for interaction, including object information, parts information, marks for proceeding to a next task or returning to a previous task, parts positions, relevant videos, and caution and warning buttons.

In the step of linking the 3D manual to a corresponding 2D manual using the file by means of a 2D manual linking part, the 3D manual is linked to the corresponding 2D manual using the file which includes the positions of 2D drawings in a video, object label names, the start and end times of bounding boxes for interaction, and the positions of the bounding boxes in a video frame, and a corresponding interaction is performed when an annotation in the video is clicked.

In another aspect, an apparatus for converting 3D manuals into 2D interactive videos for a cloud service, proposed in the present disclosure, includes: performing labeling for annotations in a 3D manual for a cloud service and machine learning for recognizing the annotations; automatically recognizing the annotations, fine-adjusting automatically unrecognized annotations, and generates a file for converting the 3D manual into a 2D interactive video; linking the 3D manual to a corresponding 2D manual using the file; extracting and handling artificial intelligence knowledge based on work instructions in the 2D manual; and performing neural network tasks and linguistic inferences for processing voice requests, and informing the user about the handling and completion of a requested task by sending visual and audio feedback, in order to execute commands based on the artificial intelligence knowledge, the digital twin, and the annotations in the 3D manual.

A method and apparatus for converting 3D manuals into 2D interactive videos for a cloud service according to embodiments of the present disclosure may create a three-dimensional digital twin of a real machine through XR (eXtended Reality) technology, for a complicated 3D manual such as on aircraft, and additionally provide instructions, animations, and 2D engineering drawings on the screen which are required for assembly and disassembly.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 10-B are views showing an automatically structured file according to an embodiment of the present disclosure.

DETAILED DESCRIPTION

Hereinafter, an embodiment of the present disclosure will be described in detail with reference to the accompanying drawings.

Figure 1A:
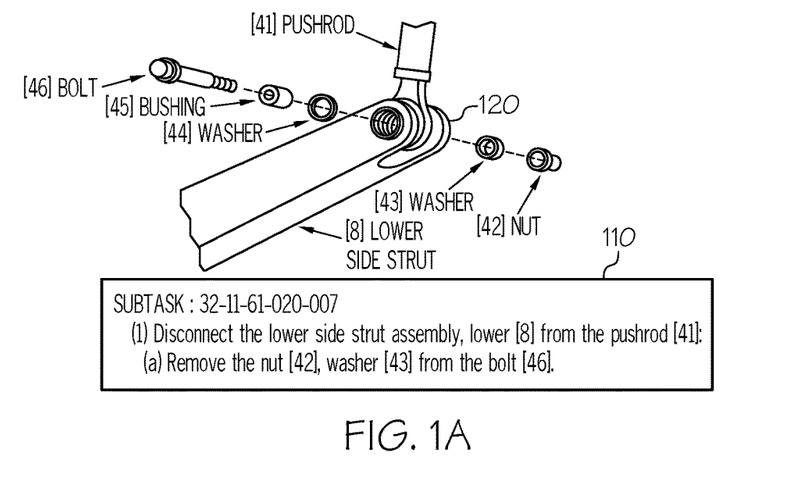
FIGS. 1A-B are views showing a 3D manual according to an embodiment of the present disclosure and a 2D manual according to the conventional art.
Figure 1B:
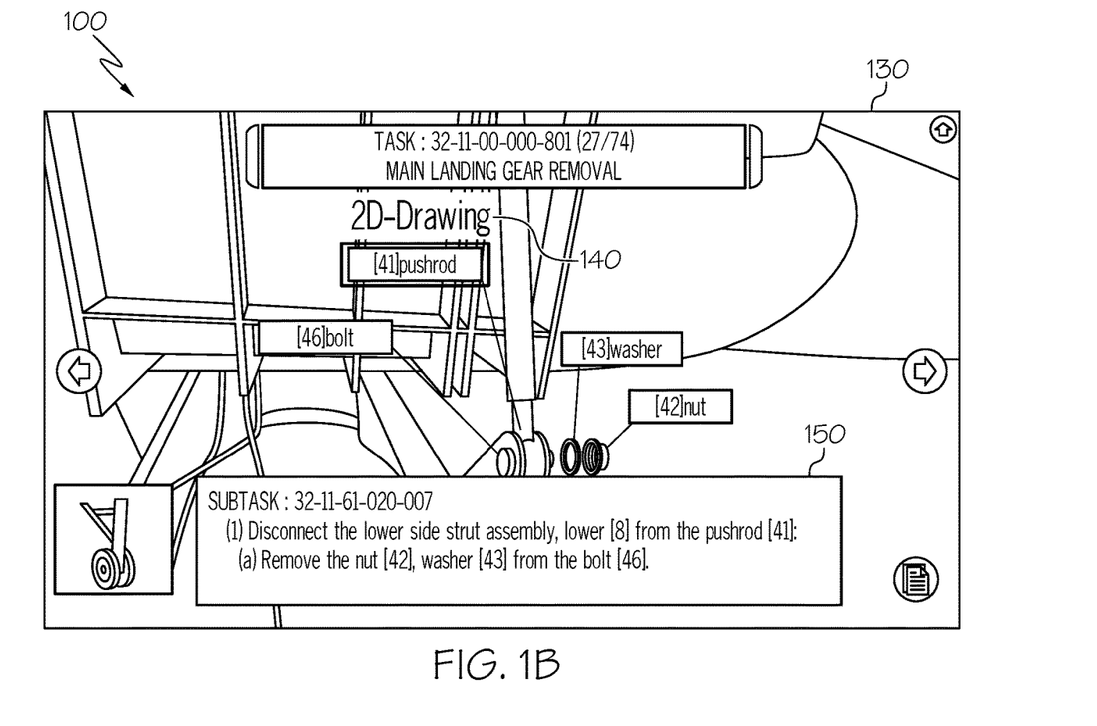

FIG. 1 is a view 100 showing a 3D manual according to an embodiment of the present disclosure and a 2D manual according to the conventional art.

(a) of FIG. 1 is a view showing a 2D manual according to the conventional art, and (b) of FIG. 1 is a view showing a 3D manual according to an embodiment of the present disclosure.

As shown in (a) of FIG. 1, when a user performs work as instructed in a complicated technical manual such as on aircraft, they usually refer to instructions 110 for assembly and disassembly and paper-based 2D engineering drawings 120 for comparison with real-world three-dimensional mechanical parts. However, since this method involves a paper-based 2D manual, it is hard to match the part numbers with the parts of the real-world physical machine, and it takes some time to understand how they match, which is time-consuming and less efficient and therefore often causes errors.

The 3D manual proposed in the present disclosure may create a three-dimensional digital twin of a real machine through XR (eXtended Reality) technology, and additionally provide instructions, animations, and 2D engineering drawings on the screen which are required for assembly and disassembly.

As shown in (b) of FIG. 1, a work instruction 150, required part numbers, and various 2D engineering drawings 140 may be displayed on a 3D virtual machine 130.

According to the embodiment of the present disclosure, various 2D engineering drawings and information the worker requires may be provided in one click by integrating 3D content in a metaverse and a manual and creating a video in a 3D space from the worker's field of view.

According to the embodiment of the present disclosure, an interactive video that is exactly the same as the 3D manual may be created by preserving specific times of 3D animations and annotations, in order to reduce the time taken to download 3D content containing an aircraft maintenance and management manual from a cloud.

The interactive video as used herein is a form of video that provides clickable objects to provide video-related information. It shows engineering drawings of parts, presents how to use a necessary tool, and provides procedural information such as when proceeding to the next work instruction in a simple language or gesture. With such an interactive video, it is possible to obtain information on the video's objects, learn more about the aircraft manual guide, and allows the user to interact with the video by clicking the objects.

Figure 2:
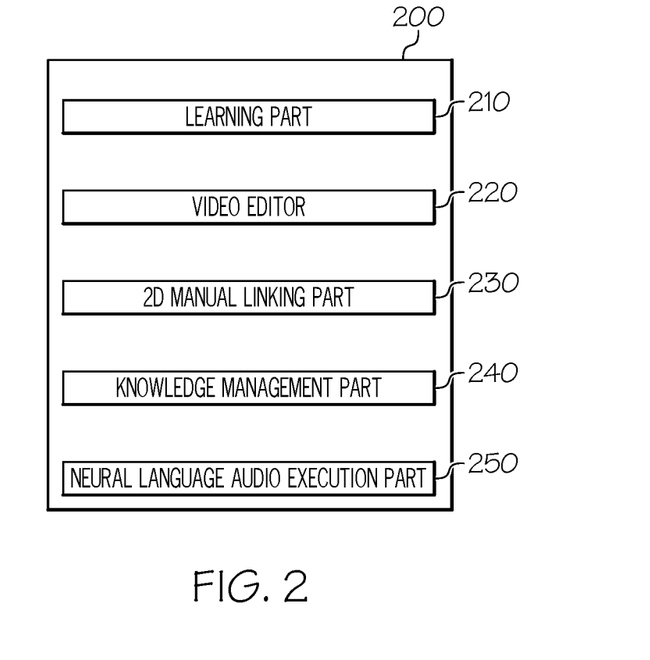
FIG. 2 is a view showing a construction of an apparatus for converting 3D manuals into 2D interactive videos for a cloud service according to an embodiment of the present disclosure.

FIG. 2 is a view 200 showing a construction of an apparatus for converting 3D manuals into 2D interactive videos for a cloud service according to an embodiment of the present disclosure.

The apparatus for converting 3D manuals into 2D interactive videos, proposed in the present disclosure, creates a three-dimensional digital twin of a real machine through XR (eXtended Reality) technology, for a complicated 3D manual, and additionally provides instructions, animations, and 2D engineering drawings on the screen which are required for assembly and disassembly. In the metaverse mixed reality (MR) for training, education, and publicity of machinery maintenance, training and education systems for complicated machinery including high-cost aircraft in mixed reality provide manuals for mounting and dismounting mechanical parts, along with a digital twin, and perform animated simulations and provide them within the user's field of view. For such a SaaS model service, it is necessary to implement a digital twin by providing massive amounts of computer graphics data and a vast amount of data in a manual through a cloud-based service. However, it takes a lot of time to download massive amount of computer graphics data, textual manuals, and 2D engineering drawings for the digital twin from a cloud to a client side, thus leading to real time issues.

The present disclosure proposes a method in which an efficient, cloud-based service is provided by converting 3D manuals into interactive videos from a visual point of view for mounting and dismounting specific parts in order to provide efficient 3D manual download service.

The proposed apparatus 200 for converting 3D manuals into 2D interactive videos for a cloud service includes a learning part 210, a video editor 220, a 2D manual linking part 230, a knowledge management part 240, and a neural language audio execution part 250.

The learning part 210 according to the embodiment of the present disclosure performs labeling for annotations in a 3D manual for a cloud service and machine learning for recognizing the annotations.

The learning part 210 according to the embodiment of the present disclosure represents the positions of annotation objects in the 3D manual in a coordinate system and performs labeling for annotations in the 3D manual so as to automatically recognize the positions of the annotations. After the labeling, it performs machine learning to automatically recognize annotations on objects in the video through an object detection model.

The video editor 220 according to the embodiment of the present disclosure automatically recognizes the annotations, fine-adjusts automatically unrecognized annotations, and generates a file for converting the 3D manual into a 2D interactive video.

The video editor 220 according to the embodiment of the present disclosure may adjust the automatically unrecognized annotations by adjusting the positions and shapes of the annotations and then adjusting the durations of the annotations.

The annotations automatically recognized by the video editor 220 according to the embodiment of the present disclosure represent a list of tasks for interaction, including, but not limited to, object information, parts information, marks for proceeding to a next task or returning to a previous task, parts positions, relevant videos, caution and warning buttons, and/or the like.

The 2D manual linking part 230 according to the embodiment of the present disclosure links the 3D manual to a corresponding 2D manual using the file.

The 2D manual linking part 230 according to the embodiment of the present disclosure can link the 3D manual to the corresponding 2D manual using the file which includes the positions of 2D drawings in a video, object label names, the start and end times of bounding boxes for interaction, and the positions of the bounding boxes in a video frame and perform a corresponding interaction when an annotation in the video is clicked.

The knowledge management part 240 according to the embodiment of the present disclosure extracts and handles artificial intelligence knowledge based on work instructions in the 2D manual.

The neural language audio execution part 250 according to the embodiment of the present disclosure performs neural network tasks and linguistic inferences for processing voice requests and informs the user about the handling and completion of a requested task by sending visual and audio feedback, in order to execute commands based on the artificial intelligence knowledge, the digital twin, and the annotations in the 3D manual.

Figure 3:
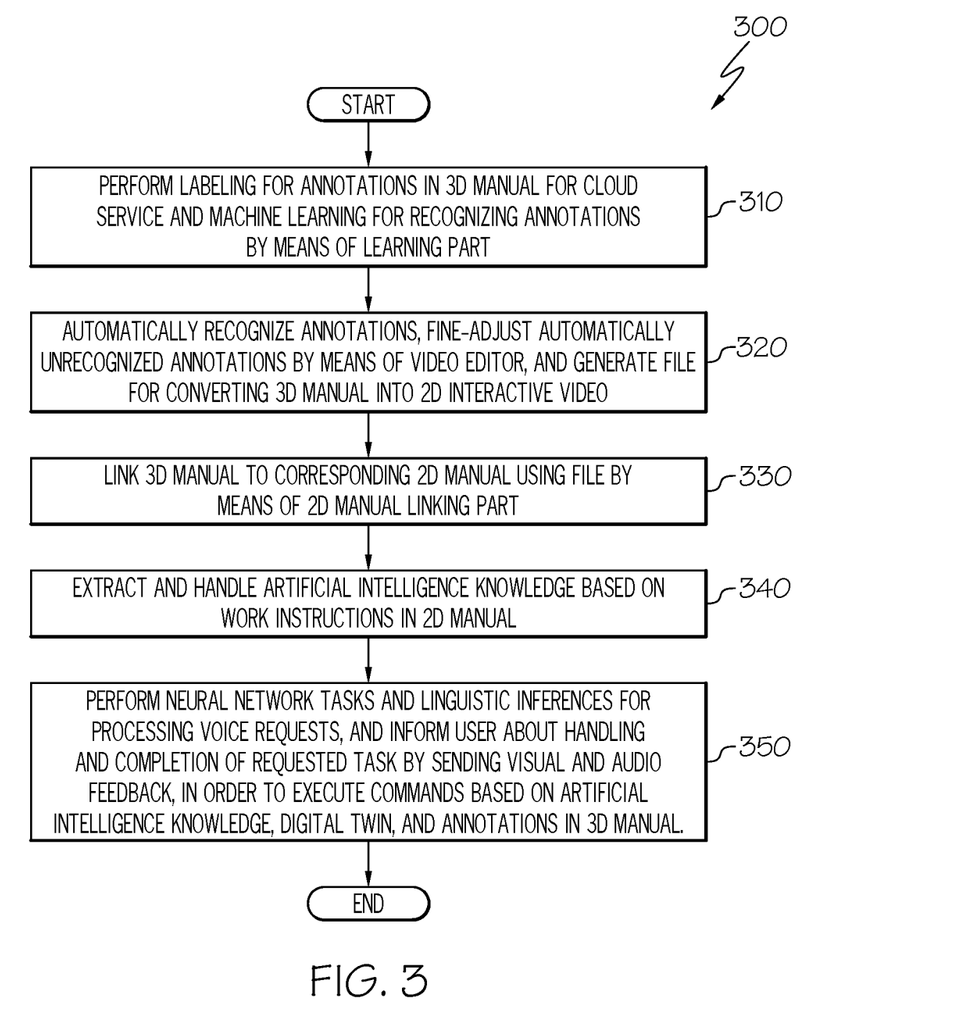
FIG. 3 is a flowchart for explaining a method for converting 3D manuals into 2D interactive videos for a cloud service according to an embodiment of the present disclosure.

FIG. 3 is a flowchart 300 for explaining a method for converting 3D manuals into 2D interactive videos for a cloud service according to an embodiment of the present disclosure.

The method for converting 3D manuals into 2D interactive videos for a cloud service includes: the step 310 of performing labeling for annotations in a 3D manual for a cloud service and machine learning for recognizing the annotations by means of a learning part; the step 320 of automatically recognizing the annotations, fine-adjusting automatically unrecognized annotations by means of a video editor, and generating a file for converting the 3D manual into a 2D interactive video; the step 330 of linking the 3D manual to a corresponding 2D manual using the file by means of a 2D manual linking part; the step 340 of extracting and handling artificial intelligence knowledge based on work instructions in the 2D manual by means of a knowledge management part; and the step 350 of performing neural network tasks and linguistic inferences for processing voice requests, and informing the user about the handling and completion of a requested task by sending visual and audio feedback, in order to execute commands based on the artificial intelligence knowledge, the digital twin, and the annotations in the 3D manual by a neural language audio execution part.

In step 310, labeling for annotations in a 3D manual for a cloud service and machine learning for recognizing the annotations are performed by means of a learning part.

First, the positions of annotation objects in the 3D manual are represented in a coordinate system, and labeling for annotations in the 3D manual is performed so as to automatically recognize the positions of the annotations. After the labeling, machine learning is performed to automatically recognize annotations on objects in the video through an object detection model.

In step 320, the annotations are automatically recognized, automatically unrecognized annotations are fine adjusted by means of a video editor, and a file for converting the 3D manual into a 2D interactive video is generated.

According to the embodiment of the present disclosure, the automatically unrecognized annotations may be adjusted by adjusting the positions and shapes of the annotations and then adjusting the durations of the annotations by means of the video editor.

The automatically recognized annotations according to the embodiment of the present disclosure represent a list of taks for interaction, including object information, parts information, marks for proceeding to a next task or returning to a previous task, parts positions, relevant videos, and caution and warning buttons.

In step 330, the 3D manual is linked to the corresponding 2D manual using the file by means of a 2D manual linking part.

According to the embodiment of the present disclosure, the 3D manual may be linked to the corresponding 2D manual using the file which includes the positions of 2D drawings in a video, object label names, the start and end times of bounding boxes for interaction, and the positions of the bounding boxes in a video frame, and a corresponding interaction may be performed when an annotation in the video is clicked.

In step 340, artificial intelligence knowledge is extracted and handled based on work instructions in the 2D manual by means of a knowledge management part.

In step 350, neural network tasks and linguistic inferences for processing voice requests may be performed, and the user may be informed about the handling and completion of a requested task by sending visual and audio feedback, in order to execute commands based on the artificial intelligence knowledge, the digital twin, and the annotations in the 3D manual by means of a neural language audio execution part.

Referring to FIGS. 4 to 10, a process for converting 3D manuals into 2D interactive videos for a cloud service according to an embodiment of the present disclosure will be described in detail.

Figure 4:
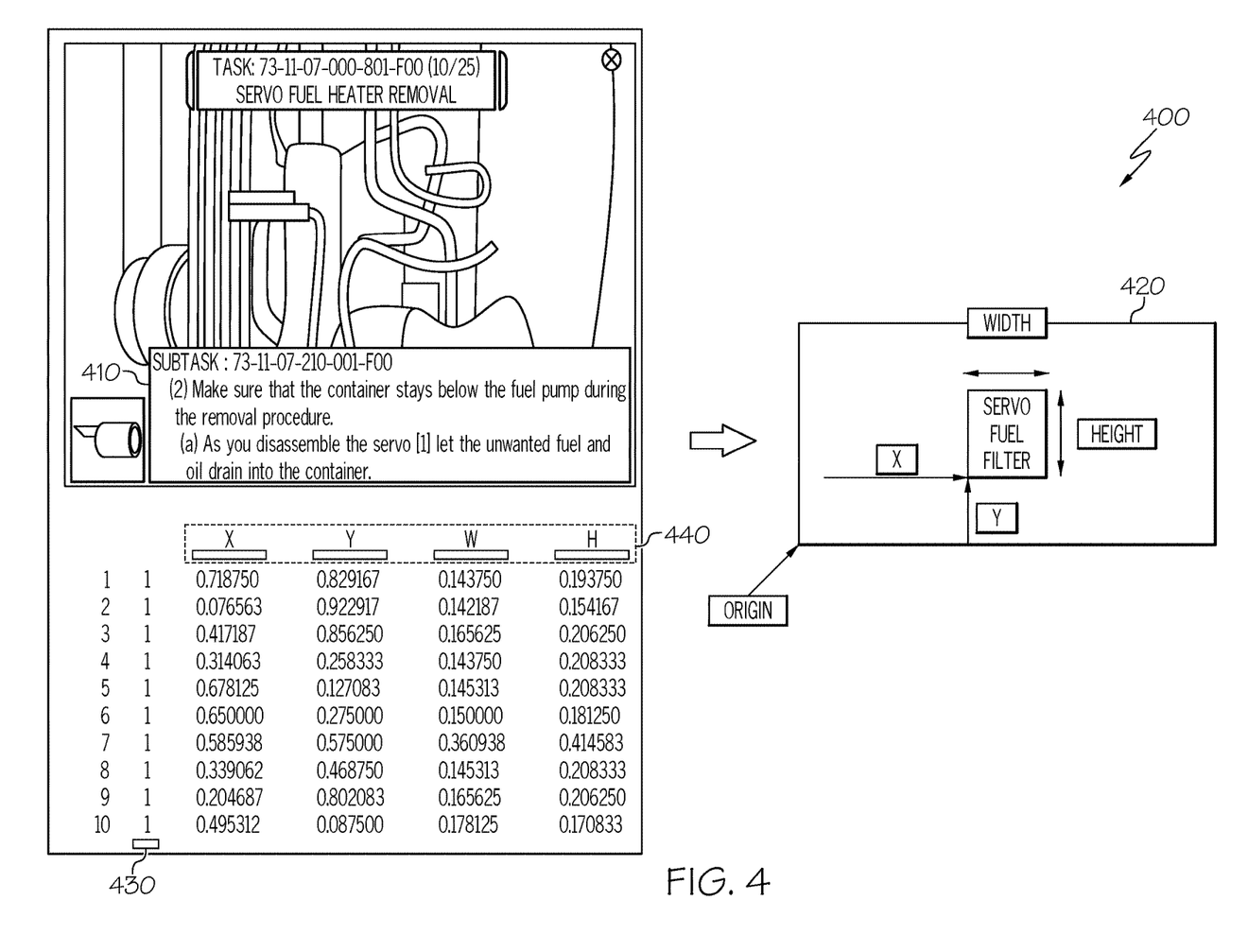
FIG. 4 is a view for explaining a process of representing the positions of annotation objects according to an embodiment of the present disclosure.

FIG. 4 is a view 400 for explaining a process of representing the positions of annotation objects according to an embodiment of the present disclosure.

Referring to FIG. 4, the position 410 of an annotation is represented in a coordinate system 440. According to the embodiment of the present disclosure, the position of a part usually shown in a work instruction is displayed in a coordinate system. It may be represented in the coordinate system 440 by using a class name 430 of an annotation object to be displayed and annotation data 440. The annotation data 440 may include information such as the X coordinate of a left top corner of the annotation object, the Y coordinate of the left top corner, the width of a rectangle of the annotation object, and the height of the rectangle.

Figure 5A:
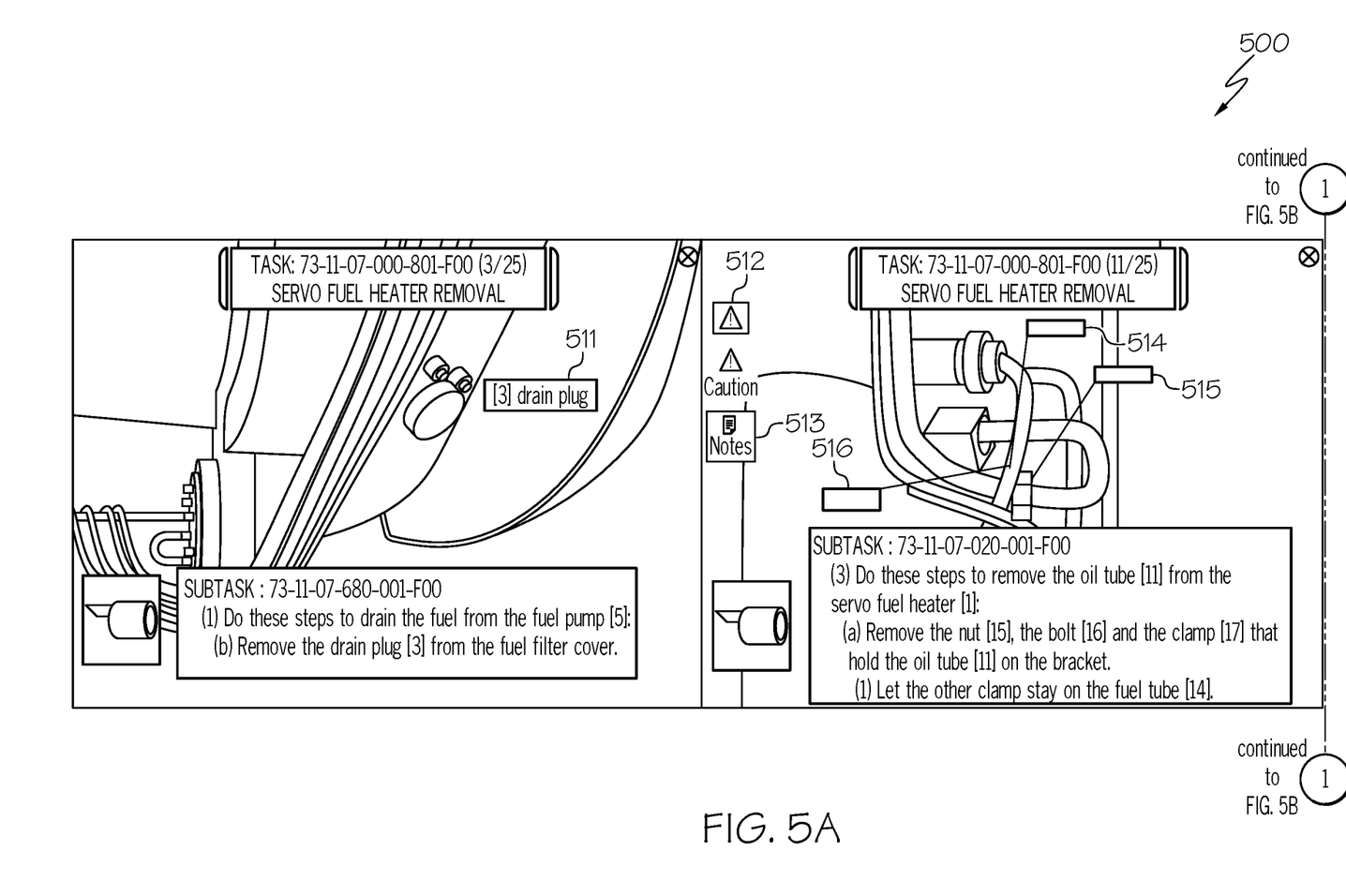
FIGS. 5A-B are views for explaining a process of performing labeling for annotations according to an embodiment of the present disclosure.
Figure 5B:
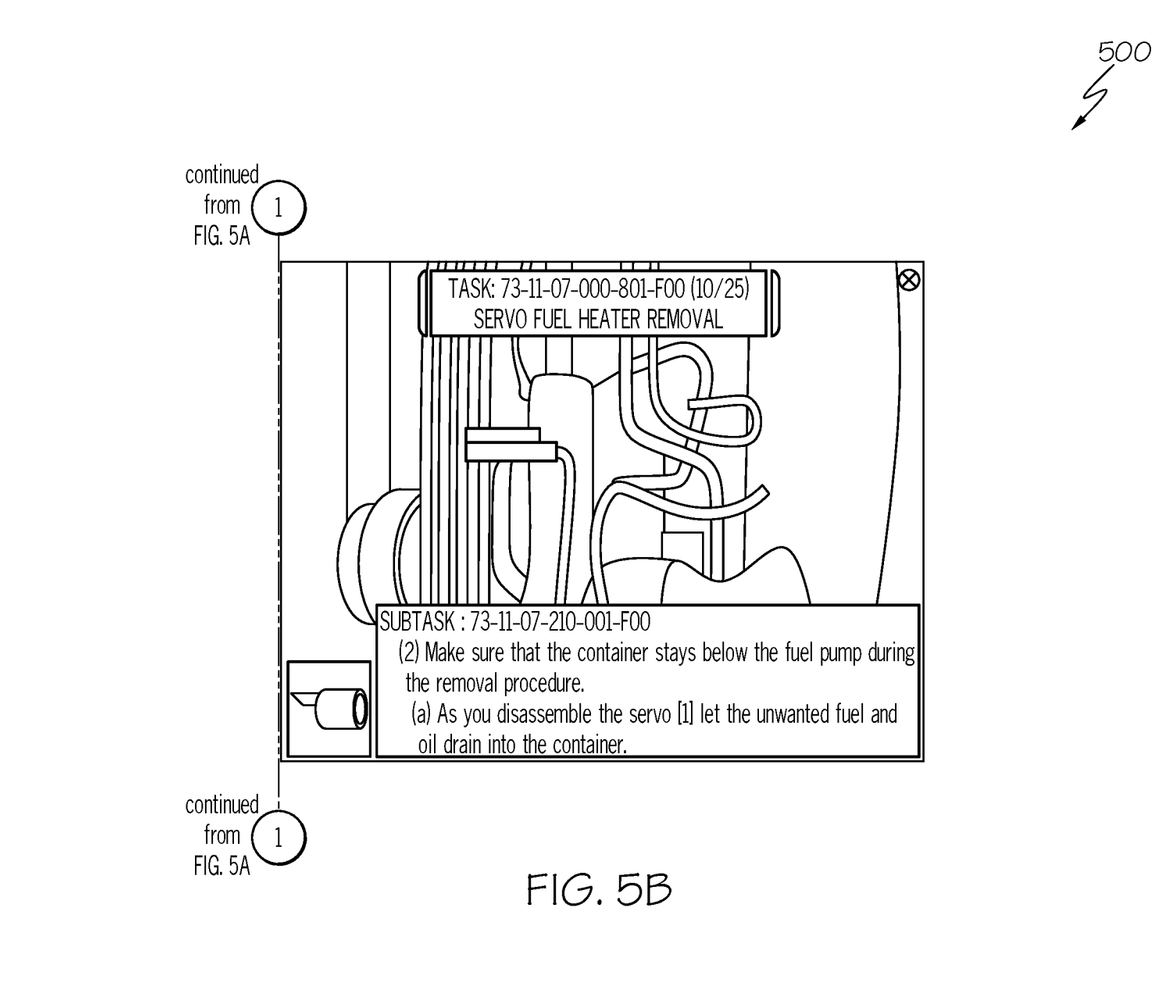

FIG. 5 is a view 500 for explaining a process of performing labeling for annotations according to an embodiment of the present disclosure.

By means of the learning part according to the embodiment of the present disclosure, labeling for annotations in a 3D manual for a cloud service and machine learning for recognizing the annotations may be performed. First, the positions 511, 512, 513, 514, and 515 of annotations in a 3D manual which is recorded in a video format may be learned, and the positions of the annotations may be automatically recognized.

In the labeling according to the embodiment of the present disclosure, each object may be labeled using no less than 200 classes by a Python-based annotation tool used for adding annotations to a video.

Figure 6:
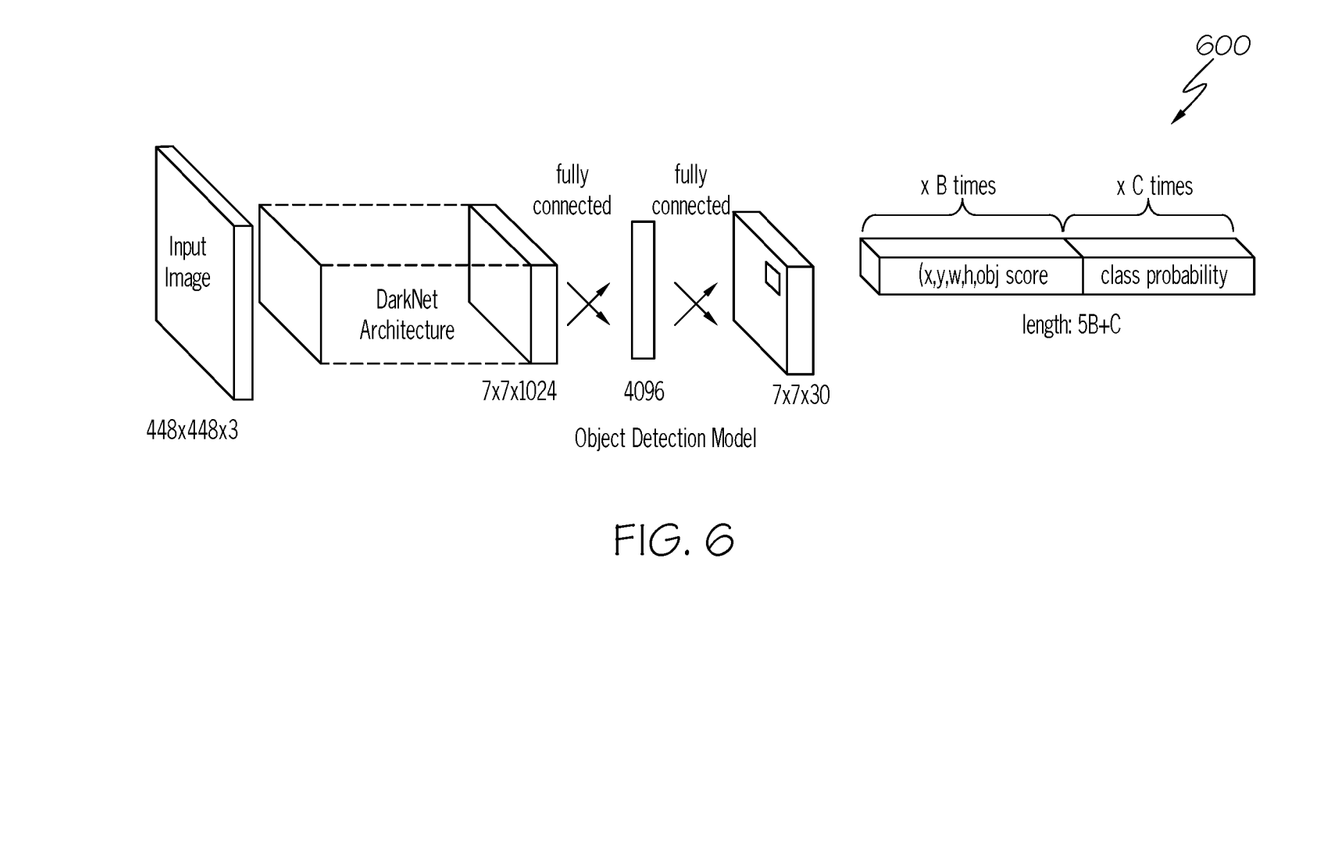
FIG. 6 is a view for explaining a machine learning process according to an embodiment of the present disclosure.

FIG. 6 is a view 600 for explaining a machine learning process according to an embodiment of the present disclosure.

According to the embodiment of the present disclosure, after the labeling, annotations for identifying parts may be automatically recognized by applying a machine learning model based on ground-truth data for annotations.

An object detection model according to the embodiment of the present disclosure may be trained for 100 epochs and divide an input image into S×S grids. If the center of an object falls in a grid cell, the grid cell is responsible for detecting the object. Through this machine learning, labeling may be performed in such a way that the positions of annotations are identified more correctly. Afterwards, video alignment and uploading are performed by means of a video editor.

The video editor according to the embodiment of the present disclosure presents a list of items to be annotated by automatic recognition. For example, it may present a list of tasks for interaction, including object information, parts information, marks for proceeding to a next task or returning to a previous task, parts positions, relevant videos, and caution and warning buttons.

In this case, 100% automatic recognition of annotations is hard to achieve. Thus, the positions of the annotations are adjusted by means of the video editor according to the embodiment of the present disclosure.

Figure 7:
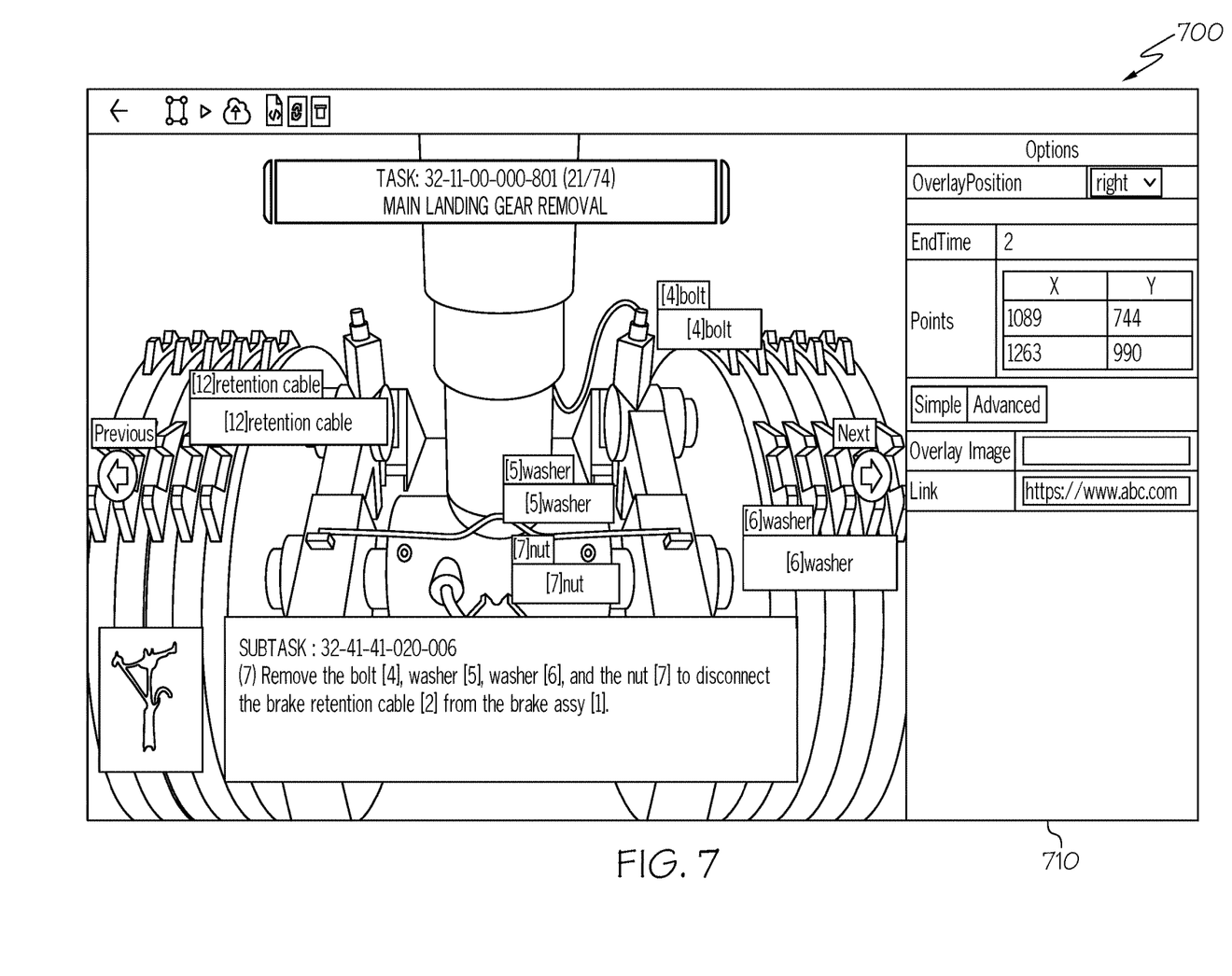
FIG. 7 is a view showing an example of use of an automatic object detection model according to an embodiment of the present disclosure.

FIG. 7 is a view 700 showing an example of use of an automatic object detection model according to an embodiment of the present disclosure.

The video editor according to the embodiment of the present disclosure may use an online or offline video editor (e.g., Pixer, Adobe, and Vimeo) in order to adjust video sampling interval before automatic recognition.

A wrong annotation may be fixed by adjusting the position and shape of the annotation and then adjusting the duration of the annotation. For example, an edited annotation may be saved by adjusting an annotation tool to a rectangular shape and controlling Play/Pause. Afterwards, the annotation may be outputted in a json file format, and object information of the output annotation. A list for the annotation may include label, object type, start time (S) of annotation, end time of annotation, and so on.

As such, it is possible to switch a wrong annotation to manual and save a generated json file by means of the video editor according to the embodiment of the present disclosure.

Referring to FIG. 7, a page 710 for linking a 3D manual to a corresponding 2D manual is depicted. A process of linking a 3D manual to a corresponding 2D manual using a generated json file by means of a 2D manual linking part according to the embodiment of the present disclosure will be described in more detail with reference to FIG. 8.

Figure 8:
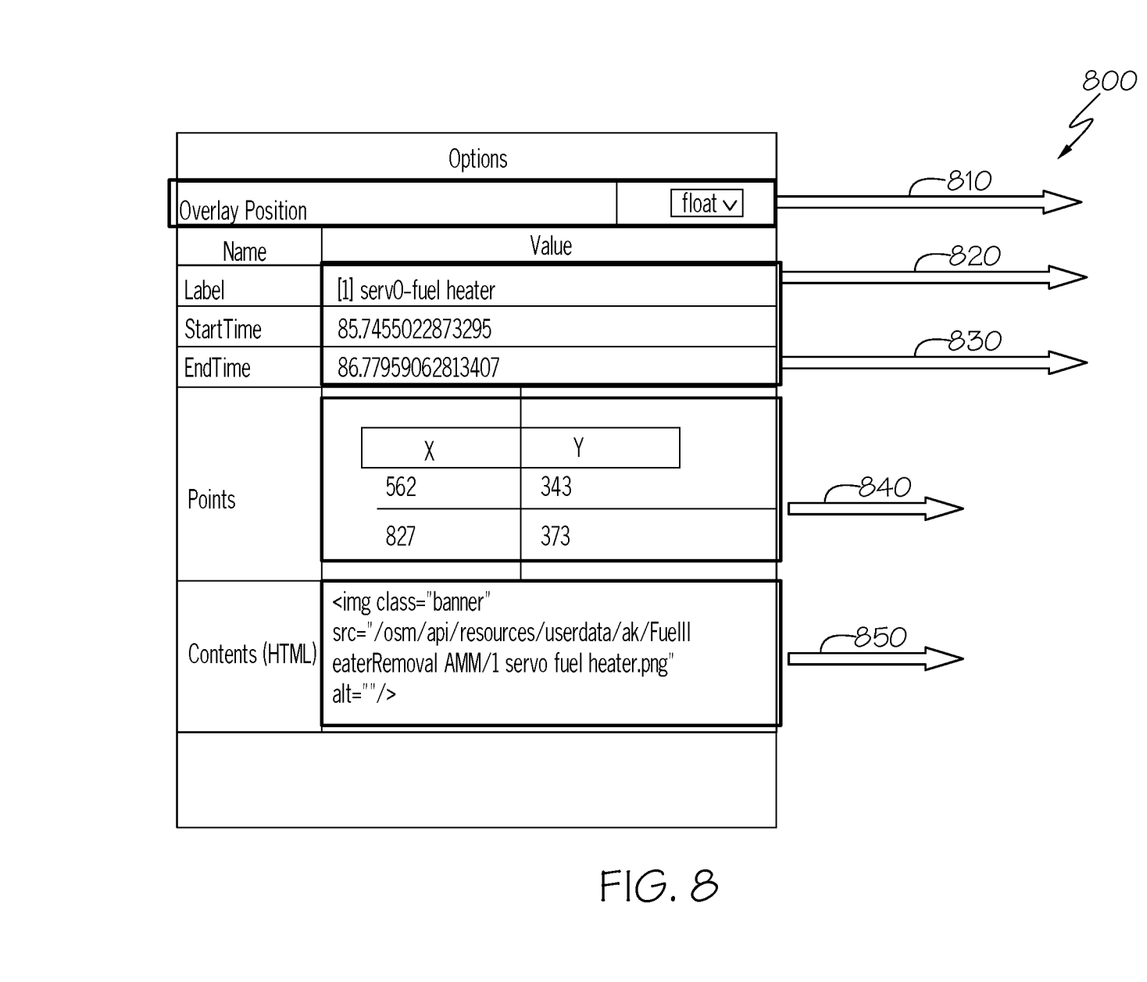
FIG. 8 is a view for explaining a process of linking a 3D manual to a corresponding 2D manual according to an embodiment of the present disclosure.

FIG. 8 is a view 800 for explaining a process of linking a 3D manual to a corresponding 2D manual according to an embodiment of the present disclosure.

Referring to FIG. 8, a 2D drawing position 810, an object label name 820, the start time and end time 830 of a bounding box for interaction, and the bounding box's position 840 may be depicted on the video. For example, an interaction may be done by linking an object name and an interaction asset together by <HTML>.

A content part 850 in FIG. 8 shows assets (e.g., a particular page in the manual, a part reference number, etc.) which are connected by clicking the annotation.

Figure 9:
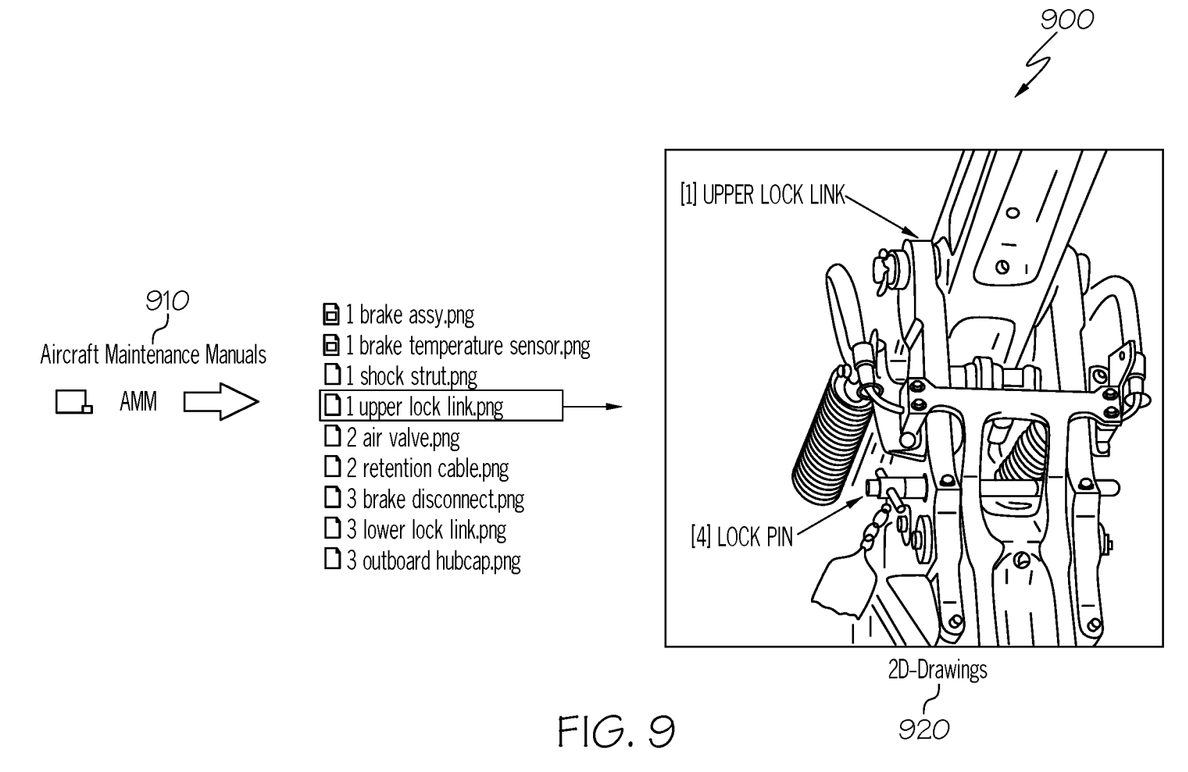
FIG. 9 is a view showing a structure of 3D manual assets for interaction according to an embodiment of the present disclosure.

FIG. 9 is a view 900 showing a structure of 3D manual assets for interaction according to an embodiment of the present disclosure.

As shown in FIG. 9, when "Upperlock link" is clicked on an aircraft maintenance manual 910, a corresponding "Upperlock link" may be marked and appear on a 2D design drawing 920.

Figure 10A:
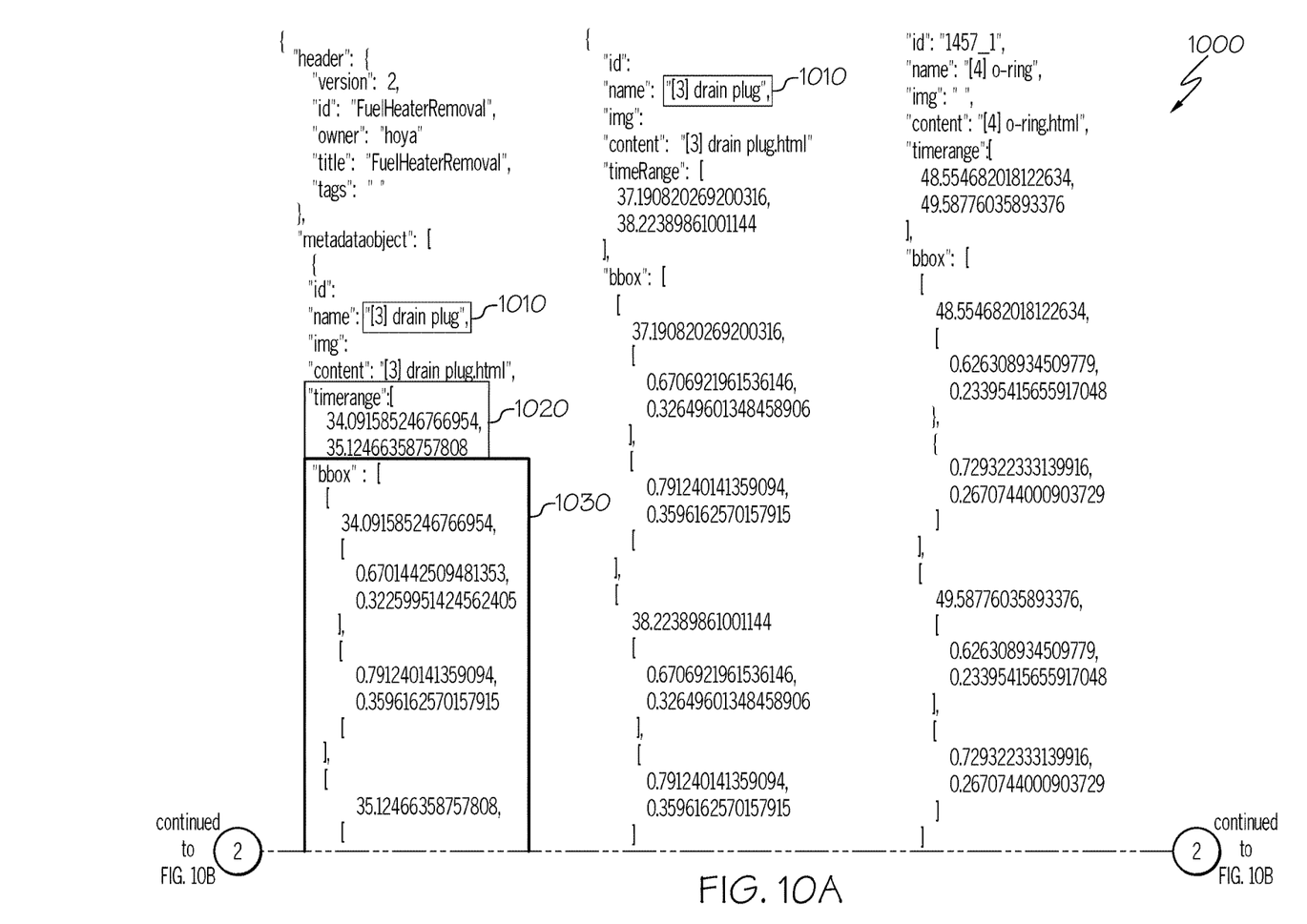
Figure 10B:
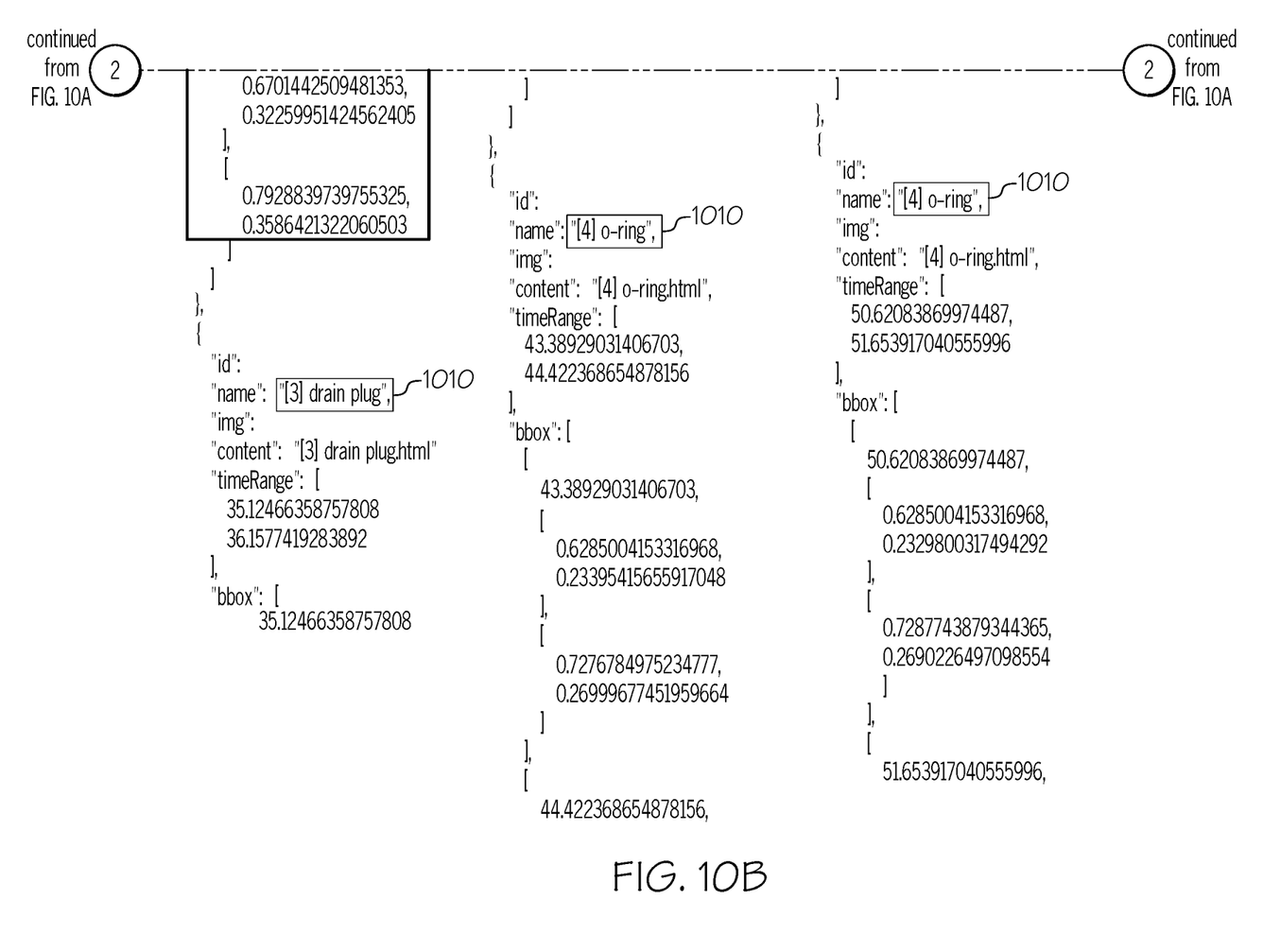

FIG. 10 is a view 1000 showing an automatically structured file according to an embodiment of the present disclosure.

As explained previously, once automatic recognition and annotation correction are completed, an automatically structured JSON file is generated. The generated file may contain information such as an object name 1010, a time range 1020, and a bounding box 1030.

As seen above, a 3D manual proposed in the present disclosure allows for creating a 3D twin of a real machine through XR (eXtended Reality) technology and additionally provides instructions, animations, and 2D engineering drawings on the screen which are required for assembly and disassembly.

In the metaverse mixed reality (MR) for training, education, and publicity of machinery maintenance, training and education systems for complicated machinery including high-cost aircraft in mixed reality provide manuals for mounting and dismounting mechanical parts, along with a digital twin, and perform animated simulations and provide them within the user's field of view.

The aforementioned apparatus may be implemented in the form of a hardware component, a software component, and/or a combination of a hardware component and a software component. For example, the system and components described in the embodiments may be implemented using one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other device capable of executing or responding to an instruction. A processor may run an operating system (OS) and one or more software applications executed on the OS. Furthermore, the processor may access, store, manipulate, process, and generate data in response to the execution of software. For convenience of understanding, one processing device has been illustrated as being used, but a person having ordinary skill in the art should understand that the processor may include a plurality of processing elements and/or a plurality of types of processing elements. For example, the processor may include a plurality of processors or a single processor and a single controller. Furthermore, a different processing configuration, such as a parallel processor, is also possible.

Software may include a computer program, code, an instruction, or a combination of one or more of these and may configure a processor so that it operates as desired or may instruct the processor independently or collectively. The software and/or data may be embodied in a machine, component, physical device, virtual equipment, computer storage medium or device of any type in order to be interpreted by the processor or to provide an instruction or data to the processor. The software may be distributed to computer systems connected over a network and may be stored or executed in a distributed manner. The software and data may be stored in one or more computer-readable recording media.

The method according to the embodiment may be implemented in the form of a program instruction executable by various computer means and stored in a computer-readable recording medium. The computer-readable recording medium may independently or collectively include program instructions, data files, data structures, and the like. The program instructions recorded in the medium may be specifically designed and configured for the embodiments, or may be known to and used by those of ordinary skill in the computer software art. Examples of the medium include a magnetic medium such as a hard disk, a floppy disk and a magnetic tape, an optical recording medium such as CD-ROM and DVD, a magneto-optical medium such as a floptical disk, and a hardware device such as ROM, RAM, and flash memory, that is specifically configured to store and execute program instructions. Examples of the program instructions may include machine-language code, such as code written by a compiler, and high-level language code executable by a computer using an interpreter.

As described above, although the embodiments have been described in connection with the limited embodiments and the drawings, those skilled in the art may modify and change the embodiments in various ways from the description. For example, the relevant results may be achieved even when the described technologies are performed in a different order than the described methods, and/or even when the described components such as systems, structures, devices, and circuits are coupled or combined in a different form than the described methods or are replaced or substituted by other components or equivalents.

Therefore, other implementations, other embodiments, and equivalents to the claims are also within the scope of the following claims.

The embodiments of the invention in which an exclusive property or privilege is claimed are defined as follows:

1. A video conversion method comprising the steps of:
performing labeling for annotations in a 3D manual for a cloud service and machine learning for recognizing the annotations;
automatically recognizing the annotations, fine-adjusting automatically unrecognized annotations, and generating a file for converting the 3D manual into a 2D interactive video, wherein the automatically unrecognized annotations are adjusted by adjusting the positions and shapes of the annotations and then adjusting the durations of the annotations, and the automatically recognized annotations represent a list of tasks for interaction, including object information, parts information, marks for proceeding to a next task or returning to a previous task, parts positions, relevant videos, and caution and warning buttons;
linking the 3D manual to a corresponding 2D manual using the file;
extracting and handling artificial intelligence knowledge based on work instructions in the 2D manual; and
performing neural network tasks and linguistic inferences for processing voice requests and informing the user about the handling and completion of a requested task by sending visual and audio feedback, in order to execute commands based on the artificial intelligence knowledge, the digital twin, and the annotations in the 3D manual.

2. The video conversion method of claim 1, wherein, in the step of performing labeling for annotations in a 3D manual for a cloud service and machine learning for recognizing the annotations by means of a learning part,
the positions of annotation objects in the 3D manual are represented in a coordinate system, and labeling for annotations in the 3D manual is performed so as to automatically recognize the positions of the annotations, and, after the labeling, machine learning is performed to automatically recognize annotations on objects in the video through an object detection model.

3. The video conversion method of claim 1, wherein, in the step of linking the 3D manual to a corresponding 2D manual using the file by means of a 2D manual linking part,
the 3D manual is linked to the corresponding 2D manual using the file which includes the positions of 2D drawings in a video, object label names, the start and end times of bounding boxes for interaction, and the positions of the bounding boxes in a video frame, and a corresponding interaction is performed when an annotation in the video is clicked.

4. A video conversion apparatus comprising:
a processor;
a memory coupled to the processor, the memory containing instructions, that when executed by the processor, perform the steps of:
performing labeling for annotations in a 3D manual for a cloud service and machine learning for recognizing the annotations;
automatically recognizing the annotations, fine-adjusting automatically unrecognized annotations, and generating a file for converting the 3D manual into a 2D interactive video, wherein the automatically recognizing adjusts the automatically unrecognized annotations by adjusting the positions and shapes of the annotations and then adjusting the durations of the annotations, and the automatically recognized annotations represent a list of tasks for interaction, including object information, parts information, marks for proceeding to a next task or returning to a previous task, parts positions, relevant videos, and caution and warning buttons;

linking the 3D manual to a corresponding 2D manual using the file;

extracting and handling artificial intelligence knowledge based on work instructions in the 2D manual; and performing neural network tasks and linguistic inferences for processing voice requests and informing the user about the handling and completion of a requested task by sending visual and audio feedback, in order to execute commands based on the artificial intelligence knowledge, the digital twin, and the annotations in the 3D manual.

5. The video conversion apparatus of claim 4, wherein the labeling represents the positions of annotation objects in the 3D manual in a coordinate system and performs labeling for annotations in the 3D manual so as to automatically recognize the positions of the annotations, and, after the labeling, performs machine learning to automatically recognize annotations on objects in the video through an object detection model.

6. The video conversion apparatus of claim 4, wherein the linking links the 3D manual to the corresponding 2D manual using the file which includes the positions of 2D drawings in a video, object label names, the start and end times of bounding boxes for interaction, and the positions of the bounding boxes in a video frame and performs a corresponding interaction when an annotation in the video is clicked.

* * * * *